United States Patent
Yoshida et al.

(10) Patent No.: US 10,062,873 B2
(45) Date of Patent: Aug. 28, 2018

(54) SECONDARY BATTERY AND BATTERY PACK USING THE SAME

(71) Applicant: Sanyo Electric Co., Ltd., Daito-shi, Osaka (JP)

(72) Inventors: Shinichirou Yoshida, Hyogo (JP); Eiji Okutani, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 247 days.

(21) Appl. No.: 15/188,623

(22) Filed: Jun. 21, 2016

(65) Prior Publication Data

US 2016/0372722 A1 Dec. 22, 2016

(30) Foreign Application Priority Data

Jun. 22, 2015 (JP) .................................. 2015-124408

(51) Int. Cl.
| | |
|---|---|
| *H01M 2/06* | (2006.01) |
| *H01M 2/10* | (2006.01) |
| *H01M 2/26* | (2006.01) |
| *H01M 2/30* | (2006.01) |
| *H01M 2/22* | (2006.01) |

(52) U.S. Cl.
CPC .......... *H01M 2/06* (2013.01); *H01M 2/1077* (2013.01); *H01M 2/22* (2013.01); *H01M 2/26* (2013.01); *H01M 2/305* (2013.01); *H01M 2220/20* (2013.01)

(58) Field of Classification Search
CPC ............ H01M 2/06; H01M 2/22; H01M 2/26; H01M 2/1077; H01M 2/305; H01M 2220/20
See application file for complete search history.

(56) References Cited

U.S. PATENT DOCUMENTS

| | | | | |
|---|---|---|---|---|
| 8,241,786 | B2* | 8/2012 | Taniguchi | H01M 2/305 |
| | | | | 429/178 |
| 9,653,722 | B2* | 5/2017 | Yamada | H01M 2/305 |
| 9,692,033 | B2* | 6/2017 | Nakamura | H01M 2/022 |
| 2008/0241679 | A1 | 10/2008 | Okutani et al. | |
| 2009/0087737 | A1* | 4/2009 | Yamauchi | H01M 2/22 |
| | | | | 429/185 |

(Continued)

FOREIGN PATENT DOCUMENTS

| | | |
|---|---|---|
| JP | 2004-14173 A | 1/2004 |
| JP | 2011-76867 A | 4/2011 |

*Primary Examiner* — Stewart A Fraser
(74) *Attorney, Agent, or Firm* — Westerman, Hattori, Daniels & Adrian, LLP

(57) ABSTRACT

An insertion portion of a negative electrode terminal is inserted into through-holes provided in an outer insulating member, a sealing plate, an inner insulating member, and a terminal connection portion of a negative electrode collector, and the insertion portion is crimped. A countersunk hole is provided around the through-hole of the terminal connection portion. The insertion portion of the negative electrode terminal is radially expanded in the countersunk hole. A distal end of a thin portion provided at a distal end of the crimped part of the insertion portion and the edge of the countersunk hole are welded by application of a high energy beam, and a groove is provided on the outer peripheral side of the countersunk hole.

7 Claims, 5 Drawing Sheets

(56) References Cited

U.S. PATENT DOCUMENTS

2011/0076552 A1* 3/2011 Taniguchi ............ H01M 2/305
                                                                     429/181
2012/0270085 A1* 10/2012 Taniguchi ............ H01M 2/305
                                                                     429/94

* cited by examiner

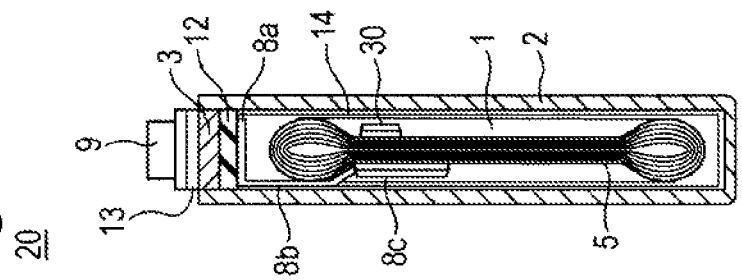
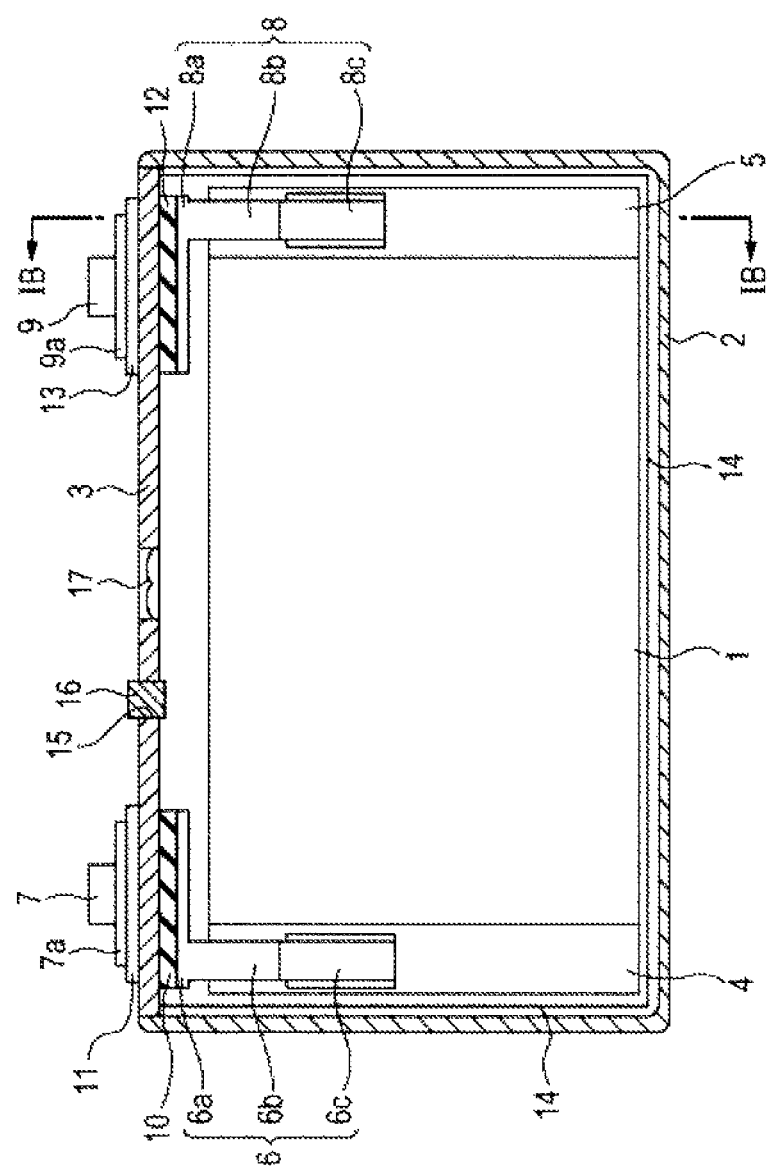

SECONDARY BATTERY AND BATTERY PACK USING THE SAME

CROSS REFERENCE TO RELATED APPLICATIONS

The present invention application claims priority to Japanese Patent Application No. 2015-124408 filed in the Japan Patent Office on Jun. 22, 2015, the entire contents of which are incorporated herein by reference.

BACKGROUND OF THE INVENTION

Field of the Invention

The present invention relates to a secondary battery and a battery pack using the same.

Description of Related Art

Alkaline secondary batteries and non-aqueous electrolyte secondary batteries are used as drive power sources for electric vehicles (EVs) and hybrid electric vehicles (HEVs, PHEVs). When these secondary batteries are used as on-board batteries for EVs, HEVs, PHEVs, and the like, these secondary batteries are used in a battery pack in which many secondary batteries are connected in series or parallel, because high capacity or high output characteristics are required.

In these secondary batteries, a battery case is formed by an outer body made of metal and having a mouth, and a sealing plate sealing the mouth. An electrode assembly consisting of a positive electrode plate, a negative electrode plate, and a separator is housed in the battery case together with electrolyte. A positive electrode terminal and a negative electrode terminal are fixed to the sealing plate. The positive electrode terminal is electrically connected to the positive electrode plate with a positive electrode collector interposed therebetween. The negative electrode terminal is electrically connected to the negative electrode plate with a negative electrode collector interposed therebetween.

Examples of methods for connecting a terminal and as collector include a method in which a terminal and a collector are connected by providing a through-hole in the collector, inserting one end of the terminal into the through-hole, and crimping the distal end of the terminal.

For example, Japanese Published Unexamined Patent Application No. 2011-76867 (Patent Document 1) discloses providing a countersunk hole around as through-hole of as collector, radially expanding the distal end of a terminal in the countersunk hole, and connecting by welding the radially expanded part of the terminal and the edge of the countersunk hole.

A possible method for connecting a terminal and a collector is a structure shown in FIG. 8. In FIG. 8, the upper side is the inner side of the battery, and the lower side is the outer side of the battery. A terminal 119 has a flange portion 119a and an insertion portion 119b formed on one side of the flange portion 119a. The insertion portion 119b of the terminal 119 is inserted from the outer side of the battery into through-holes provided in an outer insulating member 113, a sealing plate 103, an inner insulating member 112, and a collector 108. Then, the distal end of the insertion portion 119b is crimped. A countersunk hole 118c is formed around the through-hole of the collector 108, and the distal end of the insertion portion 119b is radially expanded in the countersunk hole 118c. A thin portion 119d is formed at the distal end of the insertion portion 119b. The distal end of the thin portion 119d and the edge of the countersunk bole 118c are welded by application of a high energy beam such as laser to form a welded portion 122.

When implementing development on a joint between a terminal and a collector, the inventors found that the above configuration had the following problem. The countersunk hole 118c of the collector 108 is normally formed by press working. Therefore, as shown in FIG. 9, the corner formed on the edge of the countersunk hole 118c of the collector 108 is rounded, and the radius of curvature thereof may be large. When the radius of curvature of the corner is large, a large gap 200 may be formed between the distal end of the crimped part of the insertion portion 119b of the terminal 119 and the collector 108. There is a problem in that, when such a large gap 200 exists, the terminal 119 and the collector 108 cannot be successfully welded by application of a high energy beam.

BRIEF SUMMARY OF THE INVENTION

It is an object of the present invention to provide a secondary battery having improved reliability of the joint between a terminal and a collector, and a battery pack using the same.

In an aspect of the present invention, a secondary battery includes an electrode assembly having a positive electrode plate and a negative electrode plate, an outer body having a mouth and housing the electrode assembly, a sealing plate having a terminal attachment hole and sealing the mouth, a collector electrically connected to the positive electrode plate or the negative electrode plate, and a terminal connected to the collector and inserted into the terminal attachment, hole. The collector has a through-hole, and a countersunk hole is formed around the through-hole. The terminal is inserted into the through-hole, and the terminal is crimped in the countersunk hole. A distal end of the crimped part of the terminal is welded to the collector. In the collector, a groove is provided on the outer peripheral side of the countersunk hole.

In such as configuration, the terminal and the collector are firmly fixed by crimping and welding, and therefore the secondary battery has a low internal resistance and an improved vibration resistance. In addition, since in the above configuration, a groove is formed around the countersunk hole, the radius of curvature of the corner formed on the edge of the countersunk hole can be reliably prevented from being large. Therefore, a large gap can be prevented from being formed between the distal end of the crimped part of the terminal and the collector. Therefore, the quality of the welded joint between the distal end of the crimped part of the terminal and the collector is improved, and the secondary battery has high reliability.

It is preferable that the depth of the groove be smaller than the depth of the countersunk hole.

It is preferable that the distance between the countersunk hole and the groove be larger than the depth of the countersunk hole.

The depth of the countersunk hole is preferably 0.2 to 1.0 mm, more preferably 0.2 to 0.5 mm, even more preferably 0.2 to 0.4 mm.

The depth of the wove is preferably 0.1 to 0.5 mm, more preferably 0.1 to 0.3 mm, and even more preferably 0.15 to 0.25 mm.

The distance between the countersunk hole and the groove is preferably 0.3 to 2.0 mm, more preferably 0.55 to 1.0 mm, and even more preferably 0.5 to 0.8 mm.

It is preferable that the plan-view shape of the countersunk hole be an elliptical shape or a track shape.

It is preferable that the groove be divided into a plurality of sections provided on both sides of the countersunk hole.

It is preferable that a plurality of secondary batteries according to any one of the above be connected in series or parallel and used in a battery pack.

BRIEF DESCRIPTION OF THE SEVERAL VIEWS OF THE DRAWINGS

FIG. 1A is a sectional view of a secondary battery according to the embodiment, and FIG. 1B is a sectional view taken along line IB-IB of FIG. 1A;

DETAILED DESCRIPTION OF THE INVENTION

Figure 2:
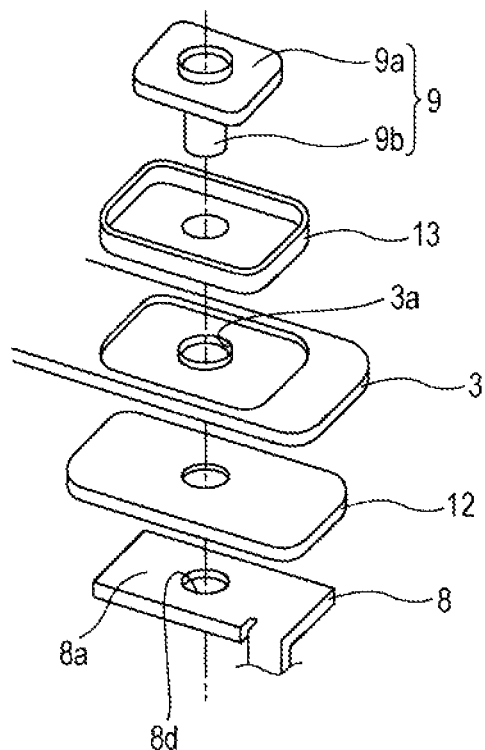
FIG. 2 is a perspective view before assembly of the vicinity of a negative electrode terminal of the secondary battery according to the embodiment.

The embodiment of the present invention will now be described in detail with reference to the drawings. The present invention is not limited to the following embodiment. First, the configuration of a prismatic secondary battery 20 according to the embodiment will be described with reference to FIGS. 1A and 1B.

As shown in FIGS. 1A and 1B, the prismatic secondary battery 20 has a prismatic outer body 2 made of metal and having a mouth at the top thereof, and a sealing plate 3 made of metal and sealing the mouth. A battery case is formed by the prismatic outer body 2 and the sealing plate 3. The prismatic outer body 2 and the sealing plate 3 are made of metal, and are preferably made of aluminum or aluminum alloy. A flattened rolled electrode assembly 1 in which a positive electrode plate (not shown) and a negative electrode plate (not shown) are rolled with a separator (not shown) interposed therebetween is housed in the prismatic outer body 2 together with electrolyte. In the positive electrode plate, a positive electrode active material mixture layer containing a positive electrode active material is formed on a positive electrode substrate made of metal, and a part where the positive electrode substrate is exposed is formed along the longitudinal direction. In the negative electrode plate, a negative electrode active material mixture layer containing a negative electrode active material is formed on a negative electrode substrate made of metal, and a part where the negative electrode substrate is exposed is formed along the longitudinal direction. The positive electrode substrate is preferably made of aluminum or aluminum alloy, and the negative electrode substrate is preferably made of copper or copper alloy.

The rolled electrode assembly 1 has, at one end in the rolling axis direction, a positive electrode substrate exposed portion 4 where the positive electrode active material mixture layer is not formed, and has, at the other end in the rolling axis direction, a negative electrode substrate exposed portion 5 where the negative electrode active material mixture layer is not formed. A positive electrode collector 6 is connected by welding to the positive electrode substrate exposed portion 4. A positive electrode terminal 7 is connected to the positive electrode collector 6. A negative electrode collector 8 is connected by welding to the negative electrode substrate exposed portion 5. A negative electrode terminal 9 is connected to the negative electrode collector 8. A positive electrode collector receiving part is disposed on a side of the positive electrode substrate exposed portion 4 that is opposite to the side on which the positive electrode collector 6 is disposed. A negative electrode collector receiving part 30 is disposed on a side of the negative electrode substrate exposed portion 5 that is opposite to the side on which the negative electrode collector 8 is disposed.

The positive electrode collector 6 has a terminal connection portion connected to the positive electrode terminal 7, a lead portion 6b extending from the terminal connection portion toward the rolled electrode assembly 1, and a connection portion 6c provided at the distal end of the lead portion 6b and connected to the positive electrode substrate exposed portion 4. The positive electrode collector 6 is preferably made of aluminum or aluminum alloy. The thickness of the positive electrode collector 6 is preferably about 0.5 to 2 mm.

The negative electrode collector 8 has a terminal connection portion 8a connected to the negative electrode terminal 9, a lead portion 8b extending from the terminal connection portion 8a toward the rolled electrode assembly 1, and a connection portion 8c provided at the distal end of the lead portion 8b and connected to the negative electrode substrate exposed portion 5. The negative electrode collector 8 is preferably made of copper or copper alloy. The thickness of the negative electrode collector 8 is preferably about 0.5 to 2 mm.

The positive electrode terminal 7 is fixed to the sealing plate 3 with an outer insulating member 11 interposed therebetween. The positive electrode collector 6 is fixed to the sealing plate 3 with an inner insulating member 10 interposed therebetween. The negative electrode terminal 9 is fixed to the sealing plate 3 with an outer insulating member 13 interposed therebetween. The negative electrode collector 8 is fixed to the sealing plate 3 with an inner insulating member 12 interposed therebetween. The inner insulating member 10 is disposed between the sealing plate 3 and the positive electrode collector 6. The inner insulating member 12 is disposed between the sealing plate 3 and the negative electrode collector 8. The outer insulating member 11 is disposed between the sealing plate 3 and the positive electrode terminal 7. The outer insulating member 13 is disposed between the sealing plate 3 and the negative electrode terminal 9. The positive electrode terminal 7 has a flange portion 7a and an insertion portion provided on one side of the flange portion 7a. The negative electrode terminal 9 has a flange portion 9a and an insertion portion 9b provided on one side of the flange portion 9a. The rolled electrode assembly 1 is housed in the prismatic outer body 2 while being covered by an insulating sheet 14. The insulating sheet 14 covers the rolled electrode assembly 1 and is disposed between the rolled electrode assembly 1 and the prismatic outer body 2. The sealing plate 3 is connected to the edge of the mouth of the prismatic outer body 2 by laser welding or the like. The sealing plate 3 has an electrolyte pour hole 15, and the electrolyte pour hole 15 is sealed by a sealing plug 16 after the pouring of electrolyte. A gas release valve 17 for releasing gas when the pressure in the battery increases is formed in the sealing plate 3. The positive electrode terminal 7 is preferably made of metal, and more preferably made of aluminum or aluminum alloy. The negative electrode terminal 9 is preferably made of metal, and more preferably made of copper or copper alloy. The positive electrode terminal 7 may be made of a combination of aluminum and aluminum alloy. The negative electrode terminal 9 may be made of a combination of copper and copper alloy. The inner insulating member 10, the outer insulating member 11, the inner insulating member 12, and the outer insulating member 13 are preferably made of resin.

Next, a method for manufacturing the rolled electrode assembly 1 will be described. A positive electrode plate is made by applying a positive electrode mixture containing lithium cobalt oxide ($LiCoO_2$) as a positive electrode active material to both sides of a rectangular aluminum foil having a thickness of 15 μm and serving as a positive electrode substrate to form positive electrode active material mixture layers, and forming, at one end in the short side direction, a positive electrode substrate exposed portion having a predetermined width to which the positive electrode active material mixture is not applied. A negative electrode plate is made by applying a negative electrode mixture containing, for example, natural graphite powder as a negative electrode active material to both sides of a rectangular copper foil having a thickness of 8 μm and serving as a negative electrode substrate to form negative electrode active material mixture layers, and forming, at one end in the short side direction, a negative electrode substrate exposed portion having a predetermined width to which the negative electrode active material mixture is not applied.

The positive electrode plate and negative electrode plate obtained in the foregoing manner are shifted from each other so that the positive electrode substrate exposed portion and the negative electrode substrate exposed portion do not overlap with the active material mixture layers of their opposing electrodes, and are rolled with a porous polyethylene separator interposed therebetween. Thus, a flattened rolled electrode assembly 1 is made at one end of which a positive electrode substrate exposed portion 4 in which a plurality of aluminum foils are laminated is formed and at the other end of which a negative electrode substrate exposed portion 5 in which a plurality copper foils are laminated is formed.

Next, the attachment of the negative electrode collector 8 to the sealing plate 3 will be described. The positive electrode collector 6 can be attached to the sealing plate 3 in the same manner as the negative electrode collector 8.

FIG. 2 is a perspective view of the negative electrode terminal 9 side before assembly. The outer insulating member 13 is disposed on the outer side of the sealing plate 3, and the inner insulating member 12 and the terminal connection portion 8a of the negative electrode collector 8 are disposed on the inner side of the sealing plate 3. The insertion portion 9b of the negative electrode terminal 9 is inserted from the outer side of the battery into through-holes provided in the outer insulating member 13, the sealing plate 3, the inner insulating member 12, and the terminal connection portion 8a, and the distal end of the insertion portion 9b is crimped. Thus, the negative electrode terminal 9, the outer insulating member 13, the sealing plate 3, the inner insulating member 12, and the terminal connection portion 8a are integrally fixed. A through-hole provided in the sealing plate 3 serves as a terminal attachment hole 3a. The outer insulating member 13 has a tubular portion 13a, and the tubular portion 13a is disposed between the sealing plate 3 and the insertion portion 9b.

Figure 3:
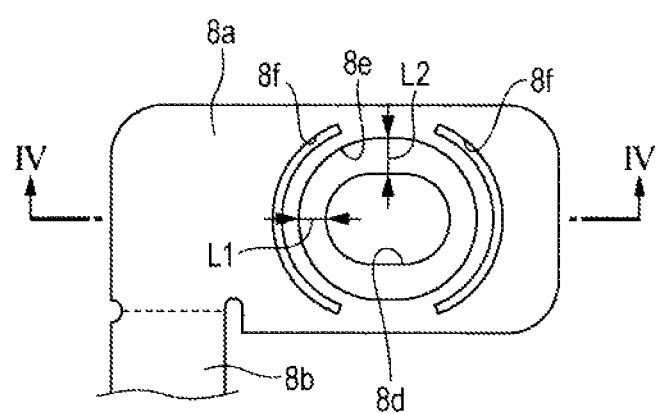
FIG. 3 is a plan view of the electrode assembly side surface of a terminal connection portion of a negative electrode collector.
Figure 4:
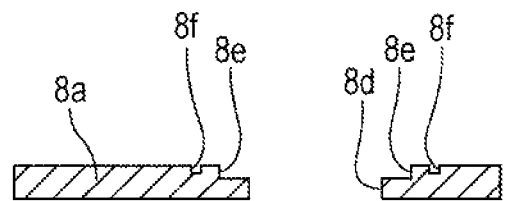
FIG. 4 is a sectional view taken along line IV-IV of FIG. 3.

FIG. 3 is as plan view of the terminal connection portion 8a of the negative electrode collector 8, and shows the rolled electrode assembly 1 side surface. FIG. 4 is a sectional view taken along line IV-IV of FIG. 3. A through-hole 8d is formed in the terminal connection portion 8a. A countersunk hole 8e is formed around the through-hole 8d. A groove 8f is formed on the outer peripheral side of the countersunk hole 8e. The countersunk hole 8e and the groove 8f are formed at the same time by press working using a die having recesses and protrusions corresponding to the shapes of the countersunk hole 8e and the groove 8f. The metal near the edge of the countersunk hole 8e can thereby be prevented from flowing to the outer peripheral side, and therefore the radius of curvature of the corner formed on the edge of the countersunk hole 8e can be reliably prevented from being large.

The plan-view shape of the through-hole 8d is preferably an elliptical shape or a track shape. It is preferable that the cross-sectional shape of the insertion portion 9b of the negative electrode terminal 9 in a direction parallel to the seating plate 3 be the same as the plan-view shape of the through-hole 8d. The negative electrode terminal 9 can thereby be prevented from rotating relative to the sealing plate 3.

The plan-view shape of the countersunk hole 8e is preferably an elliptical shape or a track shape. In this case, the insertion portion 9b of the negative electrode terminal 9 is crimped in the countersunk hole 8e, and the negative electrode terminal 9 can thereby be more reliably prevented from rotating relative to the sealing plate 3. On a line passing through the center of the through-hole 8d and extending in the longitudinal direction of the sealing plate 3, the length of the countersunk hole 8e in the longitudinal direction of the sealing plate 3 is denoted by L1. On a line passing through the center of the through-hole 8d and extending in the lateral direction of the sealing plate 3, the length of the countersunk hole 8e in the lateral direction of the sealing plate 3 is denoted by L2. The length L2 is preferably larger than the length L1. In this case, on a line passing through the center of the through-hole 8d and extending in the lateral direction of the sealing plate 3, the negative electrode terminal 9 is more firmly fixed by crimping to the terminal connection portion 8a.

In the negative electrode collector 8, the groove 8f is formed in an arc shape along the edge of the countersunk hole 8e. The groove 8f is not annular and is divided on both sides of the countersunk hole 8e. The groove 8f may be further divided into a plurality of sections. The groove 8f may be annular.

Using the negative electrode collector 8 having such a configuration, the negative electrode terminal 9, the outer insulating member 13, the sealing plate 3, the inner insulating member 12, and the negative electrode collector 8 are integrally fixed in the foregoing manner.

Figure 5:
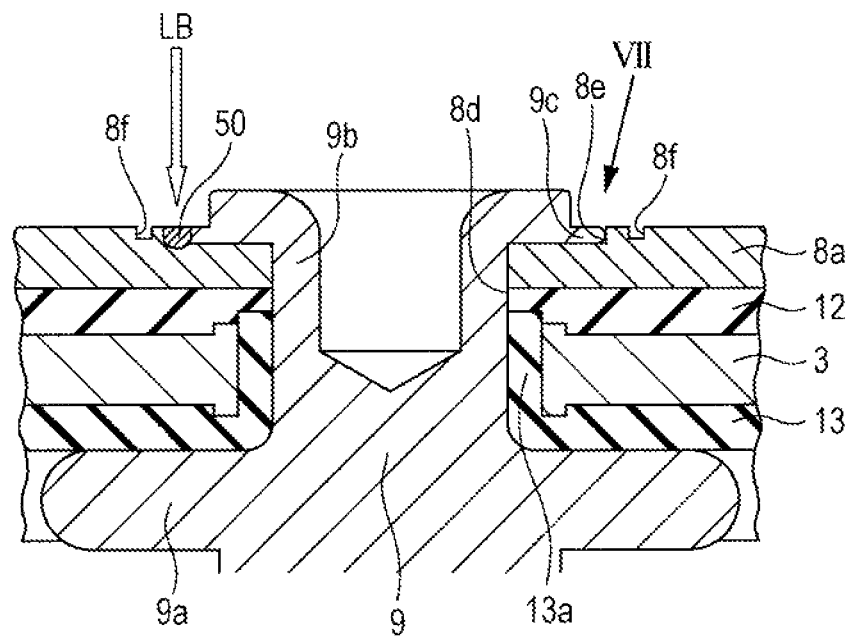
FIG. 5 is a sectional view of the vicinity of the negative electrode terminal of the secondary battery according to the embodiment.

FIG. 5 is a cross-sectional view of the vicinity of the negative electrode terminal 9 of the prismatic secondary battery 20 and is a cross-sectional view along the longitudinal direction of the sealing plate 3. In FIG. 5, the upper side is the inner side of the battery, and the lower side is the outer side of the battery. The joint between the distal end of the insertion portion 9b and the edge of the countersunk hole 8e of the terminal connection portion 8a that is located on the right side in the figure is in a state before welding. As shown in FIG. 5, the insertion portion 9b of the negative electrode terminal 9 is inserted from the outer side of the battery into through-holes provided in the outer insulating member 13, the sealing plate 3, the inner insulating member 12, and the terminal connection portion 8a of the negative electrode collector 8, and the distal end is crimped in the countersunk hole 8e. The distal end of the crimped part of the insertion portion 9b is further pressed to form a thin portion 9c. After that, a high energy beam such as laser is applied to the distal end of the thin portion 9c and the edge of the countersunk hole 8e of the terminal connection portion 8a to form a welded portion 50.

Since, in the prismatic secondary battery 20, the groove 8f is formed on the outer peripheral side of the countersunk hole 8e, that is, on the outer side in the radially expanding direction of the insertion portion 9b, a large gap is not formed between the distal end of the thin portion 9c and the edge of the countersunk hole 8e. Therefore, poor welding between the distal end of the thin portion 9c and the edge of the countersunk hole 8e of the terminal connection portion 8a can be more reliably prevented.

Figure 6:
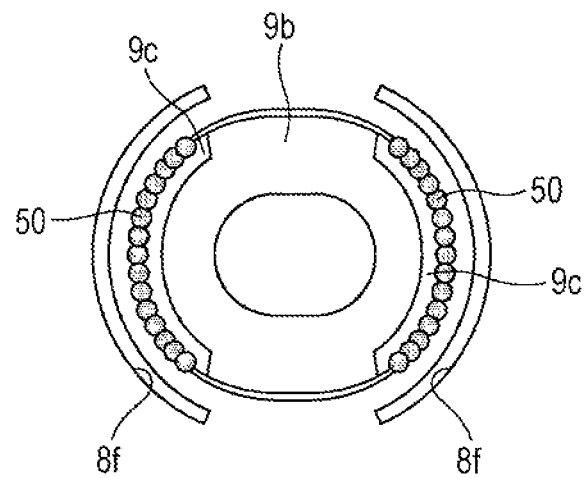
FIG. 6 shows a joint between the negative electrode terminal and the negative electrode collector in the secondary battery according to the embodiment.
Figure 7:
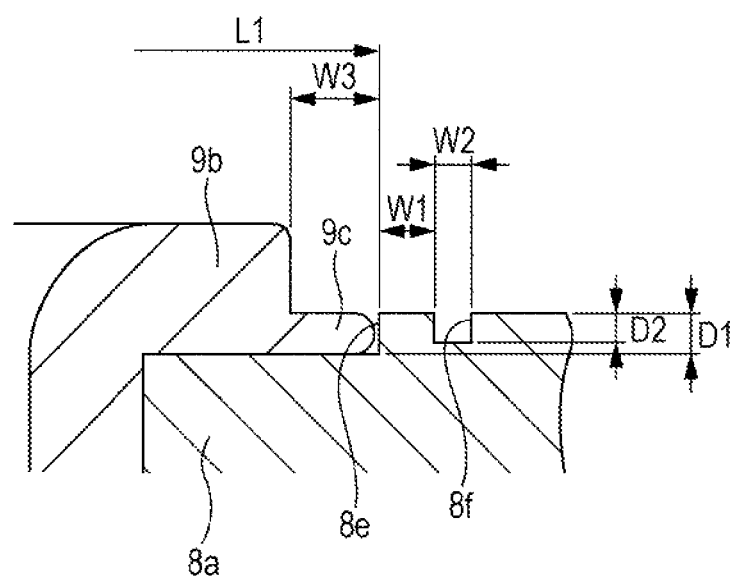
FIG. 7 is an enlarged view of part VII of FIG. 5.
Figure 8:
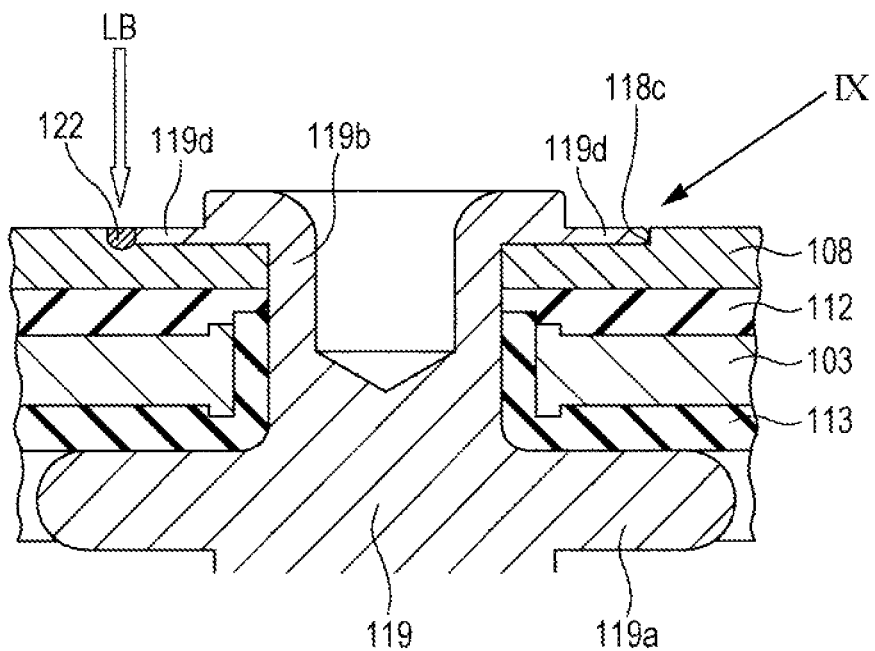
FIG. 8 is a sectional view of the vicinity of a negative electrode terminal of a secondary battery according to a related art.
Figure 9:
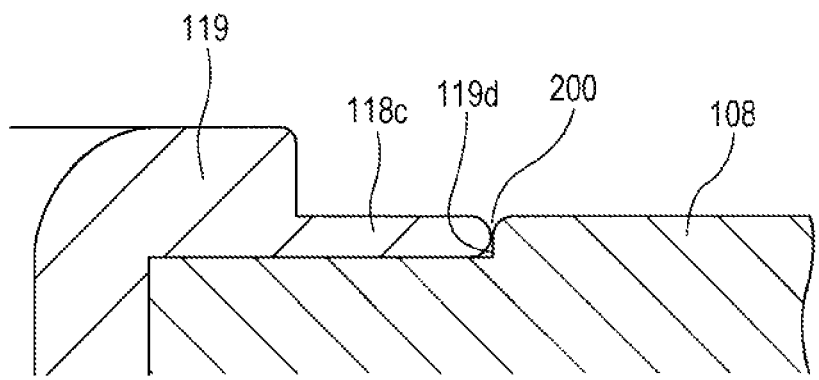
FIG. 9 is an enlarged view of part IX of FIG. 8.

FIG. 6 is a view of the joint between the negative electrode terminal 9 and the negative electrode collector 8 as seen from the rolled electrode assembly 1 side. The welded portion 50 is formed in an arc shape along the edge of the countersunk hole 8e. The groove 8f is formed on the outer peripheral side of the welded portion 50. The groove 8f is formed in an arc shape along the edge of the countersunk hole 8e. The groove 8f only have to be formed on the outer peripheral side of the welded portions 50. It is preferable that, as shown in FIG. 6, the groove 8f be not annular but be divided. When the groove 8f has such a shape, the cross-sectional area of the conductive path in the terminal connection portion 8a of the negative electrode collector 8 can be prevented from being smaller than necessity. FIG. 7 is an enlarged view of part VII in FIG. 5. FIG. 7 shows a state before the welded portion 50 is formed.

Since, as described above, in the terminal connection portion 8a of the negative electrode collector 8, the grove 8f is formed on the outer peripheral side of the countersunk hole 8e, the radius of curvature of the corner formed on the edge of the countersunk hole 8e can be prevented from being large.

As shown in FIG. 7, the depth D2 of the groove 8f is preferably equal to or smaller than the depth D1 of the countersunk hole 8e. The depth D2 of the groove 8f is more preferably smaller than the depth D1 of the countersunk hole 8e. When the distal end of the insertion portion 9b of the negative electrode terminal 9 is crimped, or when the thin portion 9c is formed, the distal end of the insertion portion 9b presses the inner wall of the countersunk hole 8e hard to the outer peripheral side, and the part located between the countersunk hole 8e and the groove 8f may deform so as to incline to the outer peripheral side. Such a problem tends to occur particularly when the thin portion 9c is formed. Such a problem can be prevented from occurring by setting the depth D2 of the groove 8f equal to or smaller than the depth D1 of the countersunk hole 8e.

The distance W1 between the countersunk hole 8e and the groove 8f is preferably larger than the depth D1 of the countersunk hole 8e. In this case, when the distal end of the insertion portion 9b of the negative electrode terminal 9 is crimped, or when the thin portion 9c is formed, the part located between the countersunk hole 8e and the groove 8f can be prevented from deforming so as to incline to the outer peripheral side. The depth D1 of the countersunk hole 8e is preferably 0.2 to 1.0 mm, more preferably 0.2 to 0.5 mm, and even more preferably 0.2 to 0.4 mm. The depth D2 of the groove 8f is preferably 0.1 to 0.5 mm, more preferably 0.1 to 0.3 mm, and even more preferably 0.15 to 0.25 mm. The distance W1 between the edge of the countersunk hole 8e and the groove 8f is preferably 0.3 to 2.0 mm, more preferably 0.5 to 1.0 mm, and even more preferably 0.5 to 0.8 mm. The width W2 of the groove 8f is preferably 0.1 to 1.0 mm, and more preferably 0.1 to 0.5 mm.

On a line passing through the center of the through-hole 8d and extending in the extending longitudinal direction of the sealing plate 3, the length of the countersunk hole 8e in the longitudinal direction of the sealing plate 3 is denoted by L1. On a line passing through the center of the through-hole 8d and extending in the longitudinal direction of the sealing plate 3, the length of the thin portion 9c in the longitudinal direction of the sealing plate 3 is denoted by W3. As shown in FIG. 7, the relationship between the length L1 and the length W3 is preferably W3≤0.5×L1, and more preferably W3≤0.6×L1. The negative electrode terminal 9 is thereby more firmly fixed by crimping to the terminal connection portion 8a.

The thickness of the terminal connection portion 8a of the negative electrode collector 8 (the thickness of the part where the countersunk hole 8e and the groove 8f are not formed) is preferably 0.5 to 2 mm.

Next, a method for attaching the positive electrode collector 6 and the negative electrode collector 8 to the rolled electrode assembly 1 will be described. Because the attachment of the positive electrode collector 6 to the rolled electrode assembly 1 and the attachment of the negative electrode collector 8 to the rolled electrode assembly 1 can be performed by substantially the same method, a method for attaching the positive electrode collector 6 to the rolled electrode assembly 1 will be described below.

The negative electrode collector 8 is disposed on the outermost surface of the rolled negative electrode substrate exposed portion 5. The negative electrode collector receiving part 30 is disposed on a side of the rolled negative electrode substrate exposed portion 5 that is opposite to the side on which the negative electrode collector 8 is disposed. One of the resistance welding electrodes is abutted to the outer surface of the negative electrode collector 8, and the other resistance welding electrode is abutted to the outer surface of the negative electrode collector receiving part 30. In a state where the negative electrode collector 8, the negative electrode substrate exposed portion 5, and the negative electrode collector receiving part 30 are interposed between the pair of resistance welding electrodes, resistance welding current is applied to resistance weld the negative electrode collector 8, the negative electrode substrate exposed portion 5 and the negative electrode collector receiving part 30. The negative electrode collector receiving part 30 is not essential and may be omitted.

It is preferable that an insulating film be disposed between the negative electrode collector 8 and the negative electrode substrate exposed portion 5 around the welded joint between the negative electrode collector 8 and the negative electrode substrate exposed portion 5. It is preferable that an insulating film be disposed between the negative electrode collector receiving part 30 and the negative electrode substrate exposed portion 5 around the welded joint between the negative electrode collector receiving part 30 and the negative electrode substrate exposed portion 5.

Assembly of Secondary Battery

The rolled electrode assembly 1 connected to the positive electrode collector 6 and the negative electrode collector 8 is inserted into the prismatic outer body 2 while being disposed in the insulating sheet 14 folded into a box shape. The joint between the sealing plate 3 and the prismatic outer body 2 is welded by laser welding to seal the mouth of the prismatic outer body 2. After that, non-aqueous electrolyte is poured through the electrolyte pour hole 15 provided in the sealing plate 3, and the electrolyte pour hole 15 is sealed by the sealing plug 16 to make a prismatic secondary battery 20.

The present invention may be applied to at least one of the positive electrode side and the negative electrode side.

OTHERS

Although a rolled electrode assembly is used in the above embodiment, a laminated electrode assembly in which a plurality of positive electrode plates and a plurality of negative electrode plates are laminated with separators interposed therebetween can be used. The method for connecting the collector and the substrate exposed portion is not particularly limited, and resistance welding, ultrasonic welding, welding by application of a high energy beam such as laser, and the like can be used.

A pressure-sensitive current breaking mechanism can be provided in the conductive path between the positive electrode plate and the positive electrode terminal or the conductive path between the negative electrode plate and the negative electrode terminal.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:
1. A secondary battery comprising:
   an electrode assembly having a positive electrode plate and as negative electrode plate;
   an outer body having a mouth and housing the electrode assembly;
   a sealing plate having a terminal attachment hole and sealing the mouth;
   a collector electrically connected to the positive electrode plate or the negative electrode plate; and
   a terminal connected to the collector and inserted into the terminal attachment hole,
   wherein the collector has a through-hole, and a countersunk hole is formed around the through-hole,
   wherein the terminal is inserted into the through-hole, and the terminal is crimped in the countersunk hole,
   wherein a distal end of the crimped part of the terminal is welded to the collector, and
   wherein in the collector, a groove is provided on the outer peripheral side of the countersunk hole.

2. The secondary battery according to claim 1, wherein the depth of the groove is smaller than the depth of the countersunk hole.

3. The secondary battery according to claim 1, wherein the distance between the countersunk hole and the groove is larger than the depth of the countersunk hole.

4. The secondary battery according to claim 1, wherein the depth of the countersunk hole is 0.2 to 1.0 mm, the depth of the groove is 0.1 to 0.5 mm, and the distance between the countersunk hole and the groove is 0.3 to 2.0 mm.

5. The secondary battery according to claim 1, wherein the plan-view shape of the countersunk hole is an elliptical shape or a track shape.

6. The secondary battery according to claim 1, wherein the groove is divided into a plurality of sections provided on both sides of the countersunk hole.

7. A battery pack comprising a plurality of batteries according to claim 1.

* * * * *